United States Patent
Podvratnik et al.

(10) Patent No.: US 10,719,343 B2
(45) Date of Patent: *Jul. 21, 2020

(54) OPTIMIZING VIRTUAL MACHINES PLACEMENT IN CLOUD COMPUTING ENVIRONMENTS

(71) Applicant: International Business Machines Corporation, Armonk, NY (US)

(72) Inventors: Amadeus Podvratnik, Filderstadt (DE); Thomas Spatzier, Sindelfingen (DE); Torsten Teich, Stuttgart (DE)

(73) Assignee: International Business Machines Corporation, Armonk, NY (US)

(*) Notice: Subject to any disclaimer, the term of this patent is extended or adjusted under 35 U.S.C. 154(b) by 506 days.

This patent is subject to a terminal disclaimer.

(21) Appl. No.: 15/294,550

(22) Filed: Oct. 14, 2016

(65) Prior Publication Data

US 2017/0031706 A1    Feb. 2, 2017

Related U.S. Application Data

(63) Continuation of application No. 13/647,677, filed on Oct. 9, 2012, now Pat. No. 9,495,215.

(30) Foreign Application Priority Data

Oct. 12, 2011 (EP) .................................. 11184860

(51) Int. Cl.
*G06F 9/455* (2018.01)
*G06F 9/50* (2006.01)
*G06F 8/61* (2018.01)

(52) U.S. Cl.
CPC ............ *G06F 9/45558* (2013.01); *G06F 8/61* (2013.01); *G06F 9/5027* (2013.01);
(Continued)

(58) Field of Classification Search
CPC ......................... G06F 9/45558; G06F 11/008
See application file for complete search history.

(56) References Cited

U.S. PATENT DOCUMENTS

| 7,743,148 B2 | 6/2010 | Ajiro |
| 7,788,671 B2 * | 8/2010 | Black-Ziegelbein ........................ G06F 9/5061 709/220 |

(Continued)

FOREIGN PATENT DOCUMENTS

WO    2010121017 A2    10/2010

OTHER PUBLICATIONS

United Kingdom Intellectual Property Office, Combined Search and Examination Report for UK Application No. GB1217787.9, dated Feb. 18, 2013, pp. 1-8, South Wales, UK.

(Continued)

*Primary Examiner* — Lewis A Bullock, Jr.
*Assistant Examiner* — Gilles R Kepnang
(74) *Attorney, Agent, or Firm* — Christopher M. Pignato

(57) ABSTRACT

Placement of instances of virtual machine (VM) images in a cloud computing environment is optimized. A request is received to deploy a new VM image instance. VM resource usage profiles are read that indicate predicted resource consumption data of the VM image. Resource pool profiles for multiple resource pools are read that indicate predicted resource consumption data for the resource pools. For each of the resource pools, the VM resource usage profile is aligned with the respective resource pool profile. An aggregated resource consumption profile is calculated as an aggregation of the predicted resource consumptions of the aligned profiles. A determination is made of one of multiple resource pools with the least predicted aggregated resource consumption, and the VM image is instantiated on the (Continued)

determined one of the multiple resource pools with the least predicted aggregated resource consumption over time.

18 Claims, 4 Drawing Sheets

(52) U.S. Cl.
CPC .......... *G06F 9/5072* (2013.01); *G06F 9/5077* (2013.01); *G06F 2009/45562* (2013.01); *G06F 2009/45591* (2013.01); *G06F 2209/5019* (2013.01)

(56) References Cited

U.S. PATENT DOCUMENTS

| | | | |
|---|---|---|---|
| 8,065,676 B1 | 11/2011 | Sahai et al. | |
| 8,078,728 B1* | 12/2011 | Pollan | G06F 9/5077 709/223 |
| 8,095,929 B1 | 1/2012 | Ji et al. | |
| 8,099,487 B1* | 1/2012 | Smirnov | G06F 11/3495 709/223 |
| 8,291,416 B2 | 10/2012 | Cartales | |
| 8,458,717 B1 | 6/2013 | Keagy et al. | |
| 8,464,267 B2* | 6/2013 | Uyeda | G06F 9/5044 718/105 |
| 8,499,066 B1 | 7/2013 | Zhang et al. | |
| 8,612,615 B2 | 12/2013 | Ferris et al. | |
| 8,615,579 B1 | 12/2013 | Vincent et al. | |
| 8,677,353 B2 | 3/2014 | Machida | |
| 8,738,333 B1* | 5/2014 | Behera | G06F 9/5061 703/2 |
| 8,739,172 B2 | 5/2014 | Prakash et al. | |
| 8,843,933 B1 | 9/2014 | Holler et al. | |
| 8,850,442 B2 | 9/2014 | Davis et al. | |
| 8,881,142 B1 | 11/2014 | Reid et al. | |
| 8,966,038 B2 | 2/2015 | Takemura | |
| 9,495,215 B2* | 11/2016 | Podvratnik | G06F 9/5027 |
| 2007/0043860 A1 | 2/2007 | Pabari | |
| 2007/0174458 A1* | 7/2007 | Boyce, Jr. | G06F 9/5077 709/226 |
| 2007/0204266 A1 | 8/2007 | Beaty et al. | |
| 2007/0271560 A1 | 11/2007 | Wahlert et al. | |
| 2008/0271038 A1 | 10/2008 | Rolia et al. | |
| 2008/0295096 A1 | 11/2008 | Beaty et al. | |
| 2009/0070771 A1* | 3/2009 | Yuyitung | G06Q 10/06 718/105 |
| 2009/0265707 A1 | 10/2009 | Goodman et al. | |
| 2009/0300173 A1* | 12/2009 | Bakman | G06F 11/008 709/224 |
| 2010/0082321 A1 | 4/2010 | Cherkasova et al. | |
| 2010/0083248 A1 | 4/2010 | Wood et al. | |
| 2010/0131649 A1* | 5/2010 | Ferris | G06F 9/5072 709/226 |
| 2010/0199285 A1 | 8/2010 | Medovich | |
| 2010/0262964 A1* | 10/2010 | Uyeda | G06F 9/5044 718/1 |
| 2010/0281478 A1* | 11/2010 | Sauls | G06F 9/5077 718/1 |
| 2010/0332658 A1* | 12/2010 | Elyashev | G06F 9/505 709/226 |
| 2011/0138147 A1* | 6/2011 | Knowles | G06F 9/5016 711/170 |
| 2011/0154320 A1* | 6/2011 | Verma | G06F 8/63 718/1 |
| 2011/0173329 A1* | 7/2011 | Zhang | G06F 1/3206 709/226 |
| 2011/0196968 A1 | 8/2011 | Kobayashi et al. | |
| 2011/0209146 A1 | 8/2011 | Box et al. | |
| 2011/0225299 A1 | 9/2011 | Nathuji et al. | |
| 2011/0239215 A1 | 9/2011 | Sugai | |
| 2011/0283279 A1* | 11/2011 | Graves | G06F 9/44589 718/1 |
| 2012/0023493 A1* | 1/2012 | Mori | G06F 9/45558 718/1 |
| 2012/0030349 A1* | 2/2012 | Sugai | G06F 9/5077 709/224 |
| 2012/0042311 A1 | 2/2012 | Biran et al. | |
| 2012/0079480 A1 | 3/2012 | Liu | |
| 2012/0102291 A1 | 4/2012 | Cherian et al. | |
| 2012/0131594 A1* | 5/2012 | Morgan | G06F 9/5072 718/105 |
| 2012/0185851 A1* | 7/2012 | Zhang | G06F 9/5083 718/1 |
| 2012/0204176 A1 | 8/2012 | Tian et al. | |
| 2012/0246638 A1 | 9/2012 | He et al. | |
| 2012/0254433 A1* | 10/2012 | Gujral | G06F 9/5072 709/226 |
| 2012/0303740 A1* | 11/2012 | Ferris | H04L 29/06 709/217 |
| 2012/0303923 A1 | 11/2012 | Behera et al. | |
| 2012/0304191 A1 | 11/2012 | Morgan | |
| 2012/0311153 A1 | 12/2012 | Morgan | |
| 2013/0007732 A1* | 1/2013 | Fries | G06F 9/45533 718/1 |
| 2013/0086235 A1* | 4/2013 | Ferris | G06F 9/505 709/223 |
| 2013/0111468 A1 | 5/2013 | Davis et al. | |
| 2013/0275975 A1* | 10/2013 | Masuda | G06F 9/5077 718/1 |

OTHER PUBLICATIONS

Germany Patent and Trademark Office, Search and Examination Report for DE Application No. 102012217202.5, dated May 14, 2013, pp. 1-8, Munich, Germany.
United Kingdom Intellectual Property Office, Examination Report for UK Application No. GB1217787.9, dated Jul. 2, 2014, pp. 1-2, South Wales, UK.
Rodrigo N. Calheiros, et al., CloudSim: a toolkit for modeling and simulation of cloud computing environments and evaluation of resource provisioning algorithms, Sofware—Practice and Experience, Aug. 24, 2010, pp. 23-50, vol. 41, John Wiley & Sons, Ltd., USA.
Anh Vu Do, et al., Profiling Applications for Virtual Machine Placement in Clouds, Proceedings of the 4th International Conference on Cloud Computing, 2011, pp. 660-667, IEEE Computer Society, Washington, DC.
Ching Chuen Teck Mark, et al., Evolutionary Optimal Virtual Machine Placement and Demand Forecaster for Cloud Computing, Proceedings of the International Conference on Advanced Information Networking and Applications, 2011, pp. 348-355, IEEE Computer Society, Washington, DC.
United States Patent and Trademark Office, Office Action for U.S. Appl. No. 13/647,677, dated Nov. 20, 2014, pp. 1-42, Alexandria, VA, USA.
Jian Tan, et al., Exploiting Resource Usage Patterns for Better Utilization Prediction, Proceedings of the First International Conference on Distributed Computing Systems Workshops, 2011, pp. 14-19, IEEE Computer Society, Nashington, DC.
United States Patent and Trademark Office, Office Action for U.S. Appl. No. 13/647,677, dated Aug. 6, 2015, pp. 1-31, Alexandria, VA, USA.
United States Patent and Trademark Office, Office Action for U.S. Appl. No. 13/647,677, dated Mar. 25, 2016, pp. 1-8, Alexandria, VA, USA.
United States Patent and Trademark Office, Notice of Allowance for U.S. Appl. No. 13/647,677, dated Jul. 27, 2016, pp. 1-12, Alexandria, VA, USA.

* cited by examiner

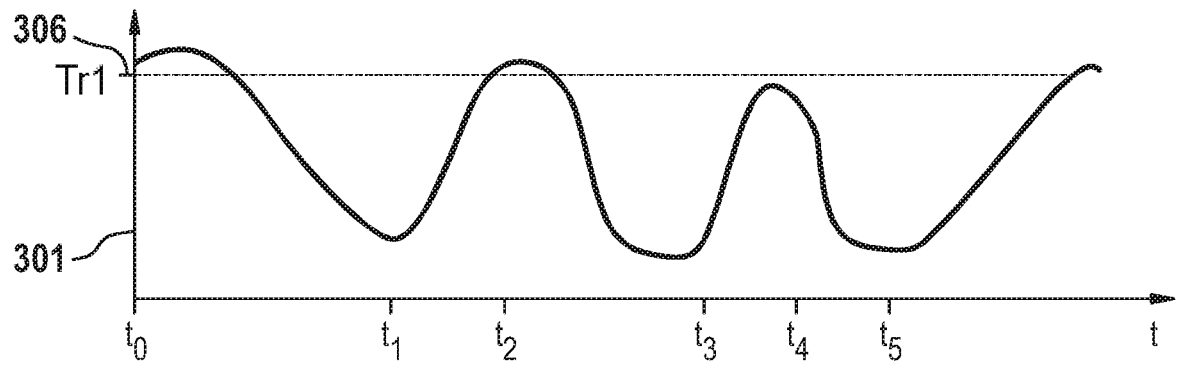
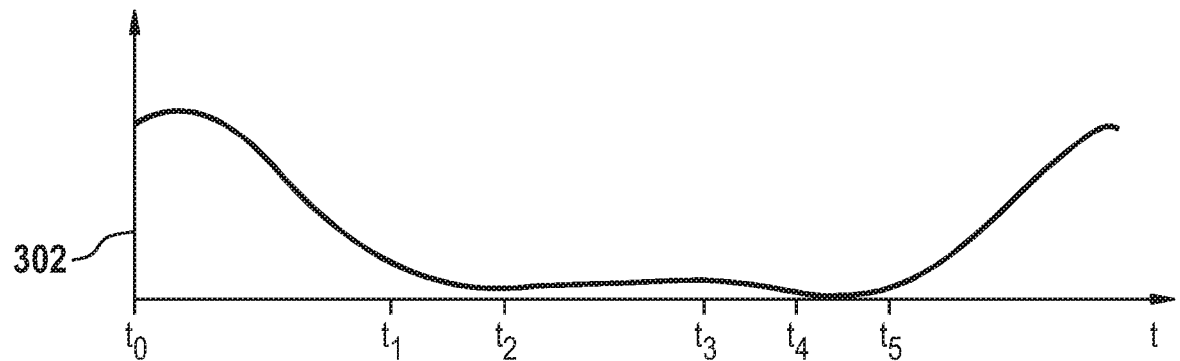
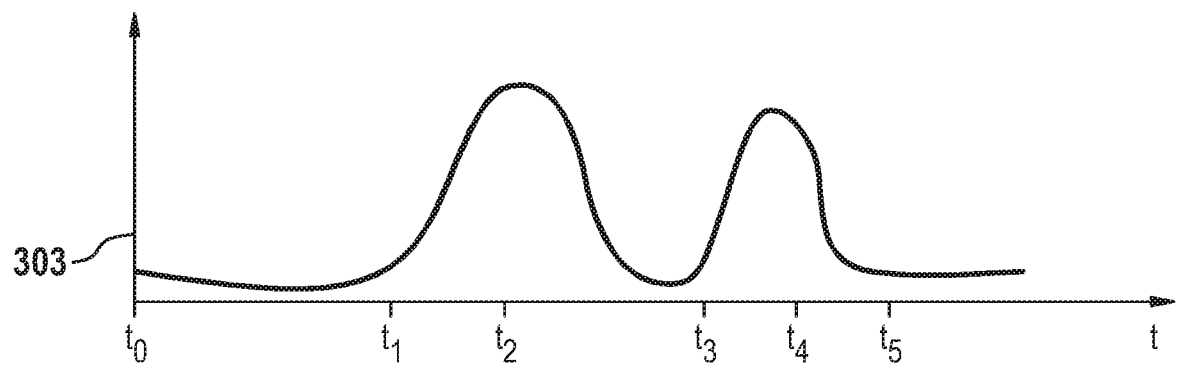
Fig. 3

OPTIMIZING VIRTUAL MACHINES PLACEMENT IN CLOUD COMPUTING ENVIRONMENTS

BACKGROUND

The present invention relates to cloud computing, and in particular, to optimizing the placement of instances of virtual machine images in cloud computing environments.

Cloud computing is becoming an innovative computing paradigm. It provides reliable, customized, and guaranteed computing infrastructures for users. The concept of cloud computing refers to the use of computing capabilities of machines provided by more than one provider center around the world. Linked by a network, these machines provide resources, such as central processing units (CPUs), that may be invoked to instantiate a virtual machine or other processes for a limited or defined duration. The user may request resources for deployment of an application and have, for example, a dedicated virtual machine (VM) to run an application.

SUMMARY

A method for optimizing the placement of instances of a plurality of virtual machine images in a cloud environment, the cloud environment including a plurality of resource pools, each resource pool including one or more resources, involves: receiving a request from a user to deploy a new instance of one of the virtual machine (VM) images, where the request indicates a VM image to be instantiated; reading, by a placement engine, a VM resource usage profile stored in association with the indicated VM image, the VM resource usage profile including first resource consumption data, the first resource consumption data indicating a predicted resource consumption of the requested instance of the indicated VM image over a first period of time; reading, by the placement engine, one resource pool profile for each of the plurality of resources pools, each resource pool profile including second resource consumption data, the second resource consumption data indicating a predicted resource consumption in a resource pool associated with the resource pool profile over a second period of time, the resource pool profile further including a current resource consumption on the resource pool; reading, if available, a user-specific VM resource usage profile stored in association with the indicated VM image and stored in association with an identifier of the user, the user-specific VM resource usage profile including third resource usage data, the third resource usage data indicating a predicted user-specific resource consumption of the requested instance of the indicated VM image over the first period of time; for each of the resource pool profiles, by the placement engine: generating a resulting VM resource usage profile by selecting one of the user-specific VM resource usage profile, where the user-specific VM resource usage profile is available, and the VM resource usage profile; analyzing the resulting VM resource usage profile and the resource pool profile, the analysis including aligning the resulting VM resource usage profile and the resource pool profile by aligning the second period of time of the resource pool profile of the resource pool with the first period of time of the resulting VM resource usage profile; and calculating an aggregated resource consumption profile that predicts a total resource consumption on the resource pool by aggregating the resource consumption of the aligned profiles; and determining, as a result of the analysis of all resource pool profiles, the one of the plurality of resource pools with a least aggregated resource consumption.

A system includes: a storage device including a plurality of virtual machine (VM) images; a plurality of resource pools, each resource pool including one or more resources; an interface configured to receive a request from a user to deploy a new instance of one of the VM images, where the request indicates a VM image to be instantiated; a placement engine configured to: read a VM resource usage profile stored in association with the indicated VM image, the VM resource usage profile including first resource consumption data, the first resource consumption data indicating a predicted resource consumption of the requested instance of the indicated VM image over a first period of time; read one resource pool profile for each of the plurality of resources pools, each resource pool profile including second resource consumption data, the second resource consumption data indicating a predicted resource consumption in a resource pool associated with the resource pool profile over a second period of time, the resource pool profile further including a current resource consumption on the resource pool; read, if available, a user-specific VM resource usage profile stored in association with the indicated VM image and stored in association with an identifier of the user, the user-specific VM resource usage profile including third resource usage data, the third resource usage data indicating a predicted user-specific resource consumption of the requested instance of the indicated VM image over the first period of time; for each of the resource pool profiles: generate a resulting VM resource usage profile by selecting one of the user-specific VM resource usage profile, where the user-specific VM resource usage profile is available, and the VM resource usage profile; analyze the resulting VM resource usage profile and the resource pool profile, the analysis including aligning the resulting VM resource usage profile and the resource pool profile by aligning the second period of time of the resource pool profile of the resource pool with the first period of time of the resulting VM resource usage profile; and calculate an aggregated resource consumption profile that predicts a total resource consumption on the resource pool by aggregating the resource consumption of the aligned profiles; and determine, as a result of the analysis of all resource profiles, the one of the plurality of resource pools with a least aggregated resource consumption.

A computer program product for optimizing the placement of instances of a plurality of virtual machine images in a cloud environment, the cloud environment including a plurality of resource pools, each resource pool including one or more resources, involves: a computer readable storage medium having computer readable program code embodied therewith, where the computer readable program code when executed on a computer causes the computer to: receive a request from a user to deploy a new instance of one of the virtual machine (VM) images, where the request indicates a VM image to be instantiated; read a virtual machine (VM) resource usage profile stored in association with the indicated VM image, the VM resource usage profile including first resource consumption data, the first resource consumption data indicating a predicted resource consumption of the requested instance of the indicated VM image over a first period of time; read one resource pool profile for each of the plurality of resources pools, each resource pool specific profile including second resource consumption data, the second resource consumption data indicating a predicted resource consumption in a resource pool associated with the resource pool profile over a second period of time, the resource pool profile further including a current resource consumption on the resource pool; read, if available, a user-specific VM resource usage profile stored in association with the indicated VM image and stored in association with an identifier of the user, the user-specific VM resource usage profile including third resource usage data, the third resource usage data indicating a predicted user-specific resource consumption of the requested instance of the indicated VM image over the first period of time; for each of the resource pool profiles: generate a resulting VM resource usage profile by selecting one of the user-specific VM resource usage profile, where the user-specific VM resource usage profile is available, and the VM resource usage profile; analyze the resulting VM resource usage profile and the resource pool profile, the analysis including aligning the resulting VM resource usage profile and the resource pool profile by aligning the second period of time of the resource pool profile of the resource pool with the first period of time of the resulting VM resource usage profile; and calculate an aggregated resource consumption profile that predicts a total resource consumption on the resource pool by aggregating the resource consumption of the aligned profiles; and determine, as a result of the analysis of all resource profiles, the one of the plurality of resource pools with a least aggregated resource consumption.

BRIEF DESCRIPTION OF THE DRAWINGS

In the following, preferred embodiments of the invention will be described in greater detail by way of example only making reference to the drawings in which:

FIG. 3 illustrates a user-specific VM resource usage profile and a resource pool profile according to an embodiment of the present subject matter.

DETAILED DESCRIPTION

In the following, like numbered elements in these figures are either similar elements or perform an equivalent function. Elements which have been discussed previously will not necessarily be discussed in later figures if the function is equivalent.

The term "cloud computing," as used herein refers to a computing platform where users may have access to applications or computing resources provided in the form of services, over a network. A user interface and application programming interface (API) on the cloud makes the infrastructure supporting such services transparent to users.

The term "virtual machine," as used herein may refer to software implementation of a computer that executes programs like a physical computer.

The term "virtual machine image," as used herein encompasses a set of data that is executable and/or data specifying for example, an operating system (OS), random access memory (RAM), disk space, etc., and indicating a particular configuration of the associated virtual machine that the system will use to run that virtual machine.

The term "Registry," as used herein refers to a data store on a tangible computer-readable storage medium. A data store includes computer and/or user-specific settings. For example, the user-specific settings may include a Service Level Agreement (SLA) that defines a minimum quality of service the user will receive.

The term "Repository," as used herein may refer to any type of information store such as a database, directory, system registry, or other means of storing various types of information.

The term "Spare," as used herein refers to an extra resource component, such as a drive or tape that is pre-designated for use as a replacement for a failed component.

The term "host platform," as used herein refers to a physical device that provides computing, network, or storage resources.

The term "resource pool," as used herein refers to a collection of host platforms that are bundled together. The purpose of this bundling is to combine the computing, networking, storage, and other types of resources such that they appear as one single resource. The cloud computing management system may allocate from the resources up to the limits of the resource pool that otherwise would exceed the physical resources of one single host platform. Resources of the resource pool are assigned to users at the time they request services or resources from the cloud computing management system. A resource may be, for example and without limitation, a processor, a network component, a disk storage, etc. that may be assigned to a user.

The term "resource usage profile," as used herein refers to a set of resource consumption data that indicates the utilization of the resource over a period of time.

Figure 1:
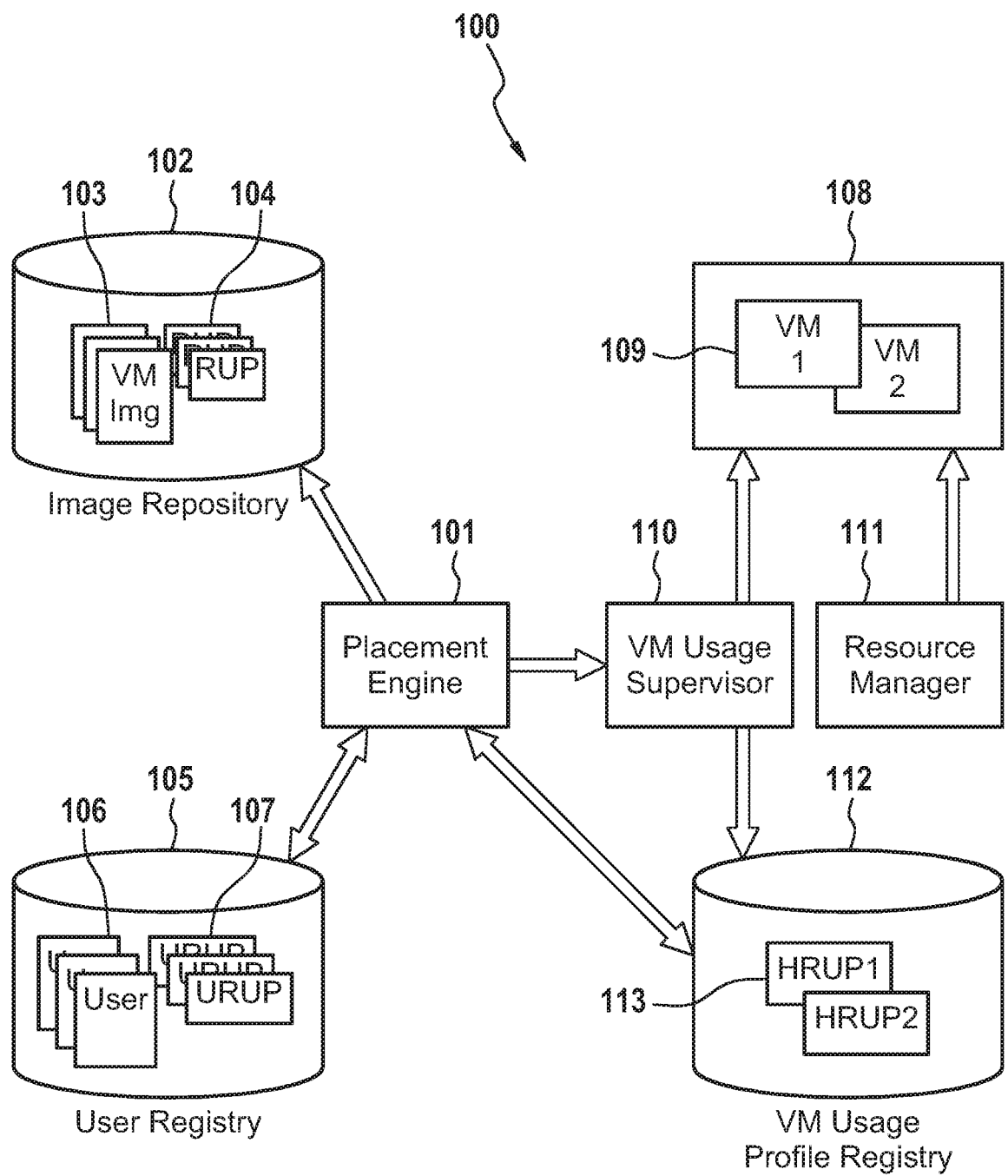
FIG. 1 illustrates system architecture operable to execute the process of the placement of virtual machine images in cloud environments according to an embodiment of the present subject matter.

FIG. 1 depicts an example of an implementation of a system architecture 100 operable to execute the process of the placement of virtual machine images in cloud environments. An image repository 102 contains a multitude of VM images 103 from which new VM image instances may be provisioned. Associated to those VM images are Resource Usage Profiles (RUPs) 104 that indicate the type of VM as well as information about resource consumption for different resources (e.g., CPU, memory, disk, etc.) for the VM based on "historical," (e.g., monitored) resource consumption data. A user registry 105 contains user profiles 106 for all users registered with the system. A user having logged into the cloud service environment may request the instantiation of a particular VM image instance and the provision of the instance by the system. The user registry 105 additionally contains user specific VM resource usage profiles, referred to herein as "User Resource Usage Profiles" (URUPs) 107, that indicate an averaged expected resource usage profile of an instance of a particular VM image requested by the user. A "profile" as used herein includes a time series of data values being indicative of a predicted or "expected" resource consumption over a period of time. This profile may include multiple averaged resource consumption values having been derived for different resource types (e.g., CPU usage, memory usage, disc storage usage, etc.). In other words, a profile indicates how a specific user uses VMs of specific types over a predefined period of time.

The user-specific VM resource profile (URUP 107) may include rules. Some of these rules may include user-specific conditions on the number, type, and/or availability of resources. These conditions are in accordance with a service level agreement (SLA). The service level agreements specify the required quality of service that a user and cloud service provider have agreed upon by contract.

The system 100 further contains a multitude of resource pools/host platforms 108 hosting running instances of VMs

109. Each running VM 109 also has a resource pool profile, referred to herein as a "Resource Usage Profile" (HRUP—Hosted RUP) 113, with which it is associated and that is stored in a resource pool profile registry 112 (VM Usage Profile Registry). During initial provisioning of a VM from a VM image 103, the HRUP 113 of the VM will be updated with data from the RUP 104 of the VM image 103. Throughout the lifetime of the VM, a VM Usage Supervisor 110 periodically monitors the actual resource consumption of VMs within a pool and updates their associated HRUPs 113 accordingly. The APIs of each host platform may be used to query resource usage data of running VMs. For example, at any point in time it is possible to see how much CPU and memory a VM consumes.

When a new VM is requested by a user, a Placement Engine 101 analyzes the resource usage characteristics stored in the RUP 104 associated with the VM image 103 selected by the user. This information may then also be supplemented by leveraging the URUP 107 of the user. The resource usage characteristics may be compared to resource usage profiles of VMs 109 running in different resource pools 108 to find the optimal resource pool where the "best fit" of predicted resource availability and of predicted resource usage may be determined. Spare resources may be calculated dynamically by comparing the VM resource usage profiles (or user-specific VM resource usage profiles) of all VM images having been instantiated on a particular resource pool with constantly received monitoring data that is indicative of the actual physical resource consumption on the resource pool. Thus, any resource shortage may be quickly detected and an existing VM image instance may be moved immediately to another resource pool.

Finally, a Resource Manager 111 may be employed to actively and dynamically control the amount and type of resources assigned to running VM instances 109 by freeing up resources and reallocating the resources to new VM instances based on an evaluation of profiles. That is, physical resources assigned to running VMs may become un-assigned from those VM instances and they may then be used for instantiating and running additional VMs or they may be re-assigned to other existing VM image instances. For example, this reallocation of resources may be performed using the VM resource usage profiles and/or the user specific VM resource usage profile to predict the specific VMs whose instances will most probably not need the resources in a future time period, and to reallocate the resource to other VM image instances.

Figure 2:
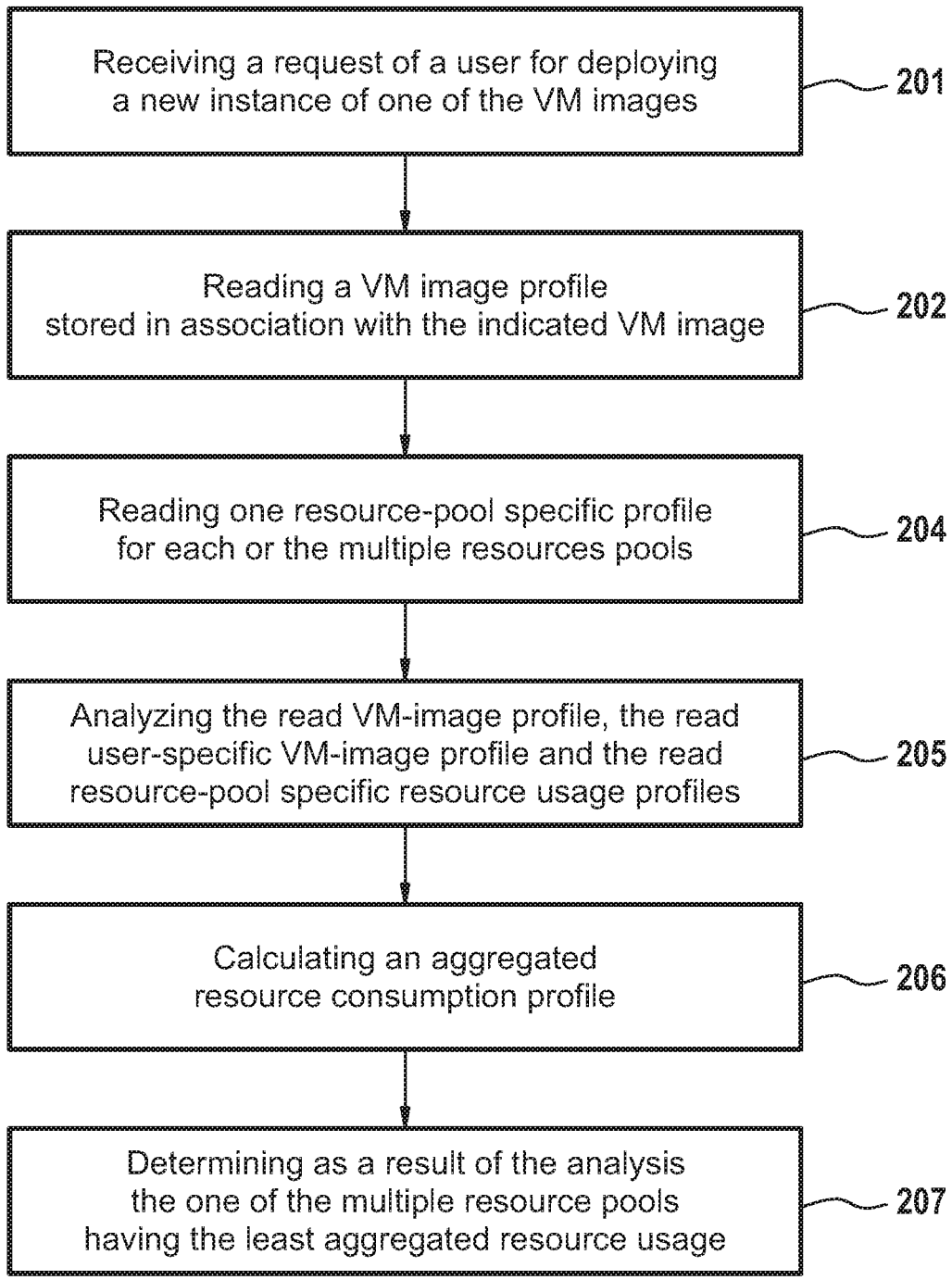
FIG. 2 is a flowchart of a method for optimizing virtual machine image placement in cloud environments according to an embodiment of the present subject matter.

FIG. 2 is a flowchart of an example of an implementation of a method for optimizing virtual machine images placement in cloud environments. After receiving, in step 201, a request of a user for deploying a new instance of one of the VM images, the Placement Engine 101 reads in step 202 the VM resource usage profile stored in association with the VM image being requested. The read VM resource usage profile may include first resource consumption data. The first resource consumption data indicates the predicted resource consumption of the requested instance of the indicated VM image over a first period of time. In step 204, the Placement Engine 101 reads one resource pool profile for each of the multiple resources pools. Each resource pool profile may include second resource consumption data. The second resource consumption data indicate current and predicted resource consumption in the resource pool associated with the resource pool profile over a second period of time. In step 205, the Placement Engine 101 analyzes the first and second resource profiles, and calculates in step 206 the aggregated resource consumption of running instances 109 and the requested instance in each of the multiple resource pools 108. In step 207, the Placement Engine 101 determines one of the multiple resource pools having the least aggregated resource usage. The step 205 is further explained in the example of FIG. 3.

FIG. 3 illustrates an example of an implementation of the average instance consumption of resources over time. A variety of resources may be considered, such as CPU usage, memory usage, disk usage, etc. Plot 303 of FIG. 3 illustrates the expected resource consumption over time of an instance of a VM image 103 being requested by a guest user for software development purposes. It is a result of the superposition of the resource usage of the user and the resource consumption of the VM image. It is to be understood that the profiles illustrated in FIG. 3 are shown using continuous changes over time. However, actual resource consumption may vary in a discrete manner over time. Accordingly, these figures are to be taken as illustrative of the concepts only.

As seen in the plot 303, the resource consumption increases at time t1 after the virtual machine instance provisioned from the requested VM image has started running. It reaches some maximum resource consumption at time t2. The resource consumption is decreased and starts increasing again at time t3 to reach a second maximum at time t4. This is an illustration, for example, of a user requesting a development machine that usually runs only during the day. This user usually makes use of this kind of machine in a regular working time, during the morning (time t2) and the afternoon (time t4). A production machine (not shown) may have a different user specific VM resource usage profile depending on the particular use case scenario of an instance of the VM image.

A plot 302 illustrates the current and expected resource consumption by a resource pool holding running virtual machine instances. In this example, the running virtual machine instances run batch processes overnight. As illustrated in the plot 302, the resource consumption reaches the maximum during the night at time t0 and is reduced to its minimum during the day.

A plot 301 illustrates the predicted total resource consumption of the resource pool and the requested user-specific VM image. As illustrated in the plot 301, a resource consumption threshold, Tr1 306, may be specified. This threshold may be used to trigger the placement and instantiation of a new VM on the resource pool for processing.

The selection of the resource pool where the requested VM will be placed may be based on the predicted resource consumption profile 301 of each of the host platforms. If a time period between an initial time ti and final time tf may include the time for the request of VM instance, two criteria may be used to select the resource pool to hold such a requested VM instance. A first criterion may indicate that the peak resource usages for any given host platform must not exceed the threshold Tr1 306 in the period of time between ti and tf. In the example of FIG. 3, the host platform would not satisfy this criterion for the period of time between time t1 and t3. While in the period of time between t3 and t5, the host platform will be considered for the final selection since the maximum of consumption does not exceed the threshold Tr1 306. A second criterion may indicate that if there is more than one host platform satisfying the previous/first criterion, then the one with the least resulting resource consumption as an integral of the superposed resource usage curve 301 between the time ti and time tf is selected.

Figure 4:
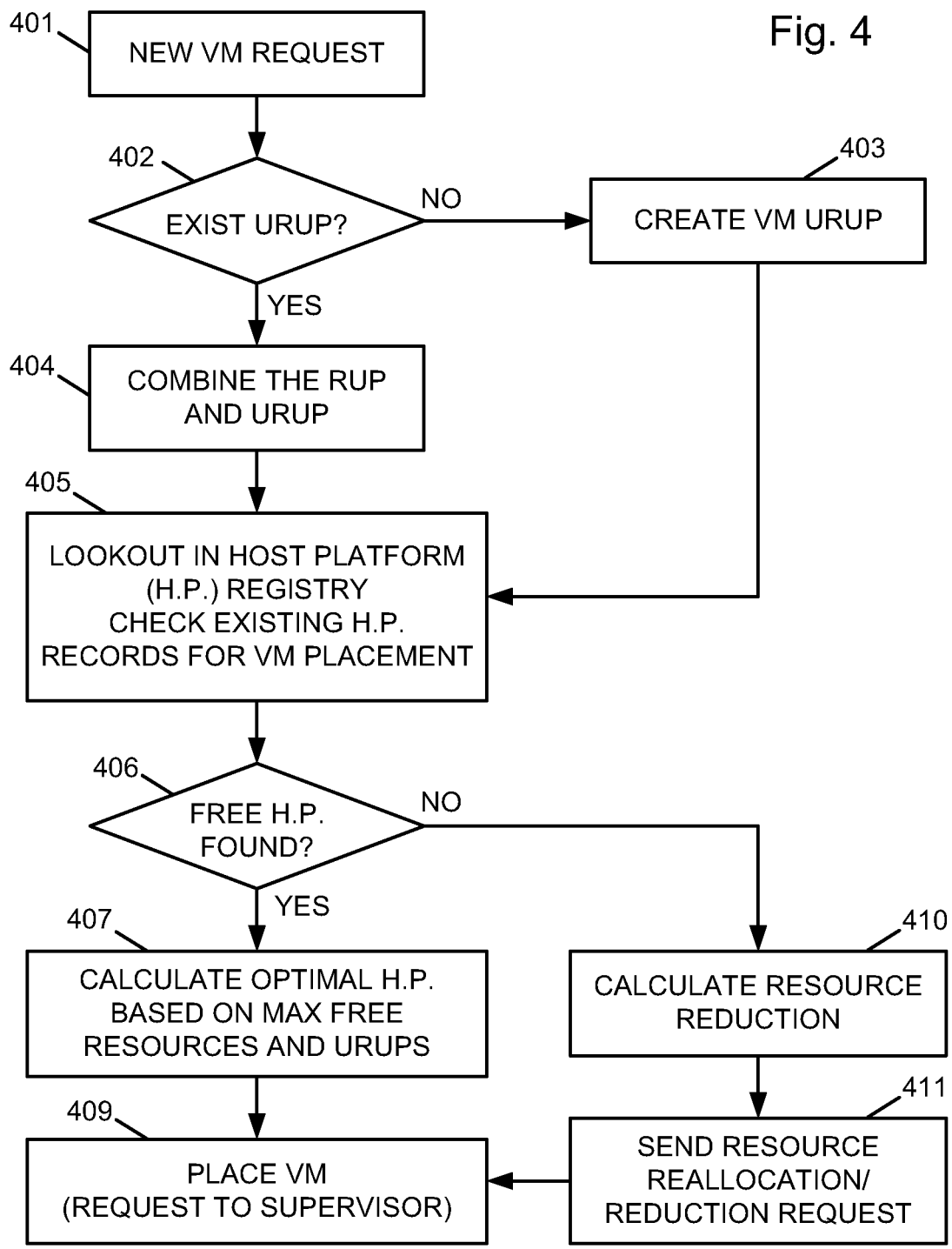
FIG. 4 is a flowchart depicting a use case in accordance with various embodiments of the present subject matter.

FIG. 4 is a flowchart depicting an example of an implementation of a use case of the present subject matter. In step 401, the process detects that the user is requesting a new VM based on a specified image 103 from the existing image repository 102. In step 402, the Placement Engine 101 checks for the given user to determine if a user defined URUP 107 already exists. If the URUP 107 does not exist, the Placement Engine 101 copies the RUP 104 of the requested VM image for user in step 403 and creates a VM URUP. If the URUP 107 exists, in step 404, the Placement Engine 101 combines data from the RUP 104 of a VM image and the URUP 107 of the requesting user to consider user-specific usage patterns (URUP) for a VM of a given type. In step 405, the Placement Engine 101 calculates for the existing host platforms the best position for the requested VM instance. This may be performed by comparing the URUP 107 with the resource usage profiles of each of the resource pools. The resource usage profile of the resource pool is obtained as superposition of the assigned resource usage profiles of all instances of all VM images running on the resource pool. The Placement Engine 101 calculates the total predicted resource consumption of each VM instance actually running on the resource pool and the requested VM image. If one or more free resources of a host platform 109 may be determined in step 406, the VM may be instantiated in the host platform 109 without reallocating resources. The Placement Engine 101 selects/calculates the host platform (H.P.) with the lowest average resource consumption (e.g., maximum free resources and URUPs) over an aligned time period at step 407.

If no free resource pool, also referred to as a "host platform," may be determined (e.g., the requested VM image is predicted not to fit into any host platform based on the current allocation of resources to resource pools), the Placement Engine 101 calculates a host platform 108 based on the existing HRUPs 113 and the URUP 107 whose expected resource usage profile provides the best available fit to the resource requirements of the requested VM instance. The resources available in this best fitting host platform may still be not be sufficient for the requirements of the VM image instance in the future, but nevertheless the requested VM image is instantiated in the best fitting host platform. Then, the Placement Engine 101 determines, by evaluating the resource pool profiles of all resource pools and the VM resource usage profile and/or the user-specific VM resource usage profile, which VM instance may not actually need a particular resource at a future moment in time when the instantiated VM image instance requires a resource of the resources type, and calculates the resource reduction at step 410. The result of this determination is used for reallocating the resource to the VM instance actually needing it at that future moment in time. Upon having determined in step 410 that a resource should be reallocated from a first VM image instance to a second VM image instance that may be part of the same or of another resource pool, the Placement Engine 101 in step 411 sends a resource reallocation/reduction request to the VM Usage Supervisor 110. The VM Usage Supervisor 110 reallocates one or more resources in accordance with the specifications in the resource reallocation/reduction request.

In response to the processing at either step 407 or step 411, in step 409, the Placement Engine 101 sends a request for placement of a VM image instance, (e.g., a request for instantiation of the VM image) to the VM Usage Supervisor 110. The VM Usage Supervisor 110 creates a new VM image instance on the chosen host platform 108. The user will be informed about the created VM image instance.

As described above and in more detail below, the present subject matter provides an improved approach to optimizing virtual machine images placement in cloud computing environments.

The present technology compares resource consumption profiles of a user that is requesting the virtual machine (VM) image, the requested virtual machine image, and each resource pool of the cloud computing environments to find an optimal place for the requested virtual machine instances.

It should be noted that conception of the present subject matter resulted from recognition of certain limitations associated with cloud computing systems. For example, it was observed that resource consumption control is a key element in today's cloud deployment infrastructures. It was additionally observed that while cloud systems are perceived to have nearly unlimited resource capabilities, they are limited by the hardware resources that are installed by the cloud system provider. As a result, it was determined that increased demand leads to an increase of required installed resources, which requires solutions for the success of a cloud deployment infrastructure. The present technology improves cloud computing systems by providing for optimizing virtual machine placement in cloud computing environments.

As described above and in more detail below, the present technology provides for optimizing the placement of instances of a plurality of virtual machine images in a cloud computing environment. The cloud environment includes multiple resource pools. Each resource pool includes one or more resources. Processing associated with the present technology may include receiving a request of a user for deploying a new instance of one of the virtual machine images, the request being indicative of the virtual machine image to be instantiated. While requesting the deployment of the virtual machine image the user optionally selects a user-specific VM resource usage profile that becomes the resulting VM resource usage profile. The resulting VM resource usage profile includes first resource consumption data, where the first resource consumption data is indicative of a predicted resource consumption for the specific user of the requested instance of the indicated virtual machine image over a first period of time. If the user did not select a user-specific VM resource usage profile, a VM resource usage profile stored in association with the indicated virtual machine image is read by a placement engine, and the read VM resource usage profile includes first resource consumption data, the first resource consumption data being indicative of a predicted resource consumption of the requested instance of the indicated virtual machine image over a first period of time. One resource pool profile is read by the placement engine for each of the multiple resources pools, each resource pool profile includes second resource consumption data, the second resource consumption data is indicative of a predicted resource consumption in the resource pool associated with the resource pool profile over a second period of time, and the resource pool profile further includes a current resource consumption on the resource pool. For each of the resource pool profiles, the placement engine executes, by analyzing the read VM resource usage profile and the read resource pool profile, the analysis including aligning the read VM resource usage profile and the read resource pool profiles by aligning the second time period of the read resource pool profiles of the resource pool with the first time period of the read VM resource usage profile, calculating an aggregated resource consumption profile being predictive of a total resource consumption on the resource pool by aggregating the resource consumption of the aligned profiles, and determining as a result of the analysis of all resource pool profiles the one of the multiple resource pools having the least aggregated resource consumption.

The present technology may be advantageous in that it allows an optimized allocation of cloud resources dependent on usage profiles. The profiles describe the average resource consumption over a period of time (e.g., over a couple of hours, days, weeks, etc.). The period of time may cover the current moment in time when executing (e.g., the analysis step and may in addition cover future hours, days, or weeks, etc.). Because the predicted time series of resource consumption for a particular virtual machine instance includes more information than an average resource consumption data value lacking the time information, a determination of an expected resource consumption of a virtual machine image instance in future time periods may be more accurate. There may be another advantage in that the usage of resource consumption profiles for determining the resource pool having the least aggregated resource consumption may increase the overall efficiency of the cloud system, and may ensure its good performance. This is due to the fact that the present technology allows a way of fully automatically and dynamically adapting the instantiation of virtual machine images on a plurality of resource pools in accordance with a dynamically changing workload of the resource pools and requested VM image instances during the run of a day. Another advantage of the present technology is that it may minimize user wait time, and thus increase user satisfaction. This is a result of evaluating resource consumption profiles including predicted resource consumption for future moments in time instead of considering only a currently physically monitored workload of the resource pools. As such, it is possible using the present technology to instantiate a requested VM image on a resource pool additionally in situations where the VM resource usage profile indicates that the resources required by the requested instance may not be provided by a particular resource pool at the current moment but may be provided, according to the resource pool profile of the resource pool at the future moment in time when they are actually needed. This feature is made possible by the fact that the resource pool profiles may additionally cover a future time period, and may therefore be indicative of the resources available in a particular resource pool at a later moment in time.

The present technology may further read a user-specific VM resource usage profile stored in association with the indicated VM image and stored in association with an identifier of the user. The user-specific VM resource usage profile may include third resource usage data, the third resource usage data being indicative of a predicted, user-specific resource consumption of the requested instance of the indicated virtual machine image over the first period of time, the user-specific resource consumption having been predicted for the user. Additionally, present technology may further use the read user-specific VM resource usage profile instead of the read VM resource usage profile when executing the analysis.

This processing may be advantageous because combining information from VM resource usage profile and user-specific VM resource usage profile may allow for better prediction of resource consumption for individual VMs.

The present technology may further instantiate the indicated VM image on the resource pool having been determined. This processing may provide an advanced way of deploying and instantiating one or more requested VM images on a plurality of available resource pools. Thus, a better utilization of available hardware resources such as processors, memory and disc space may be reached.

The resource pool having the least resource usage may be selected from the group including: the resource pool for which the lowest integral resource consumption value of the aggregated resource consumption profile was calculated; and the resource pool for which the lowest integral resource consumption value of the aggregated resource consumption profile was calculated and where the aggregated resource consumption profile doesn't comprise a value exceeding a threshold value. This processing may reduce the overhead that would be caused by running the instances on resource pools having lesser availability resources.

The user-specific VM profile may further include rules. The present technology may further apply, when executing the analysis, the rules on the read VM resource usage profile, the read user-specific VM resource usage profile, and/or the read resource pool profiles.

This processing allows the cloud service environment to guarantee that the cloud services are provided in accordance with certain conditions on the cloud computing usage. Such conditions may be a period of allowable time for running an instance of a VM image of a certain type by a specific user on the resource pools. This may ensure an optimal utilization of the resource pools and a fine-grained rule based modulation of a mainly resource consumption profile-based process of VM image instantiation.

At least some of the rules may include user-specific conditions on the number, type, and/or availability of resources. These conditions may be in accordance with a service level agreement (SLA). The service level agreements may specify the required quality of service that the user and cloud service provider agreed upon by contract.

Additionally, the VM resource usage profiles of at least one of the virtual machine images may be generated by evaluating, by a VM usage supervisor module, the current resource consumption of all instances of the at least one VM image, thereby providing first evaluated data. Predicting the resource consumption of any instance of at least one VM image over the first period of time by evaluating the first evaluated data may be performed. Updating of the VM resource usage profile stored in association with at least one VM image with the predicted resource consumption data may further be performed.

The evaluation of the resource consumption of the VM instance may be performed by retrieving the measured data from physical resources being allocated to that instance. As such, the system may be kept updated with the user and/or VM image resource requirements, which may further avoid a misallocation of resources in a situation where the user and/or VM image requirement evolves with respect to the initial requirements.

Further, the user-specific VM resource usage profile of at least one of the VM images may be generated by monitoring, by a VM usage supervisor module, the current resource consumption of all instances of at least one VM image whose instantiation has been requested by the user, thereby providing second monitoring data. Predicting the resource consumption of any instance of at least one VM image to be requested by the user over the second period of time by evaluating the second monitoring data may be performed. Updating of the user-specific VM resource usage profile stored in association with at least one VM image with the predicted resource consumption data may further be performed.

As such, user-specific requirements may be taken into consideration when generating the user specific VM resource usage profiles. Where the requirements change over time, an updated version of the user-specific VM resource usage profile may be provided, and may be used for determining the resource pool with the less aggregate resource consumption.

As an additional variation, the resource pool profiles may be generated by executing, for each of the resource pools, monitoring of the number and type of resources of the resource pool allocated to one of the one or more VM image instances running on the resource pool, thereby providing second monitoring data. The second monitoring data may include a measured physical assignment of resources to virtual machine image instances over the second period of time. Superposing the second monitoring data obtained for all virtual machine image instances running on the resource pool may be performed, thereby generating a superposed resource consumption profile for the resource pool. Using the superposed resource consumption profile for generating and/or updating the resource pool profile of the resource pool may further be performed.

As such, the overall resource usage deduced from every running virtual machine instance of a particular resource pool may provide a good estimation of the resource utilization of a resource pool, which may therefore allow a better allocation of the resources.

Further, each VM image instance running on one of the resource pools may be assigned one or more resources of the resource pool. In such circumstances, the present technology may determine, by the VM usage supervisor, all resources in at least one resource pool being unoccupied over the second time period. The determination may be executed by subtracting the aggregated resource consumption profile from a known number of all resources of at least one resource pool. Additionally, processing may be performed by determining, for the requested virtual machine image instance to be instantiated on at least one resource pool, one or more currently required resources by evaluating the VM resource usage profile or the user-specific VM resource usage profile of the indicated virtual machine image. If the number of resources of a first resource type determined to be required by the requested instance exceeds the determined number of currently unoccupied resources of the first resource type, the processing may continue by triggering, by the placement engine, the instantiation of the requested virtual machine image instance on another resource pool.

As such, the present technology may guarantee that even in a situation where the actual resource consumption of the VM image instances running on a particular resource pool may be larger than predicted and exceed the number of actual available resources in a particular resource pool, an automated and intelligent handling of the situation may be provided. The present technology may further move a running instance of a VM image from a first resource pool to another in the case where the first resource pool is determined to lack sufficient unoccupied resources. These features may avoid unplanned terminations of VM image instances when the resource requirements by the instances are no longer satisfied.

A resource manager may perform a reallocation of resources having been allocated to the deployed virtual machine upon its instantiation. In determining one of the virtual machine image instances to which the resource is to be reallocated, the aggregated resource consumption profiles may be used as input. As such, resources that have been assigned to a particular VM image instance that are actually not needed by the instance may be freed for usage by one or more other resources.

Updating of the resource pool specific resource consumption profiles of the resource pools with new resource consumption data may be performed as a result of the reallocation of resources or from the movement of the virtual machine image instance.

Additionally, the first and second time periods of each of the VM resource usage profiles and the resource pool profiles may include a set of reading points separated from each other by a predefined time period. Each reading point may include a resource consumption data value for each of a plurality of resource types, and each of the resource consumption data values may be a prediction result calculated from monitored physical resource consumption.

Further, each VM image may be stored in association with a usage-type specific VM resource usage profile. A usage type may be, for example, "development," "test," "production," or other usage type as appropriate for a given implementation. Processing may further include receiving an indicator of a requested usage type. The requested usage type may specify how the requested VM image instance will be used by the requesting user. Typically, the requested usage type is one of a set of predefined usage types. The requested usage type may be received, for example, together with the user's request for instantiating one of the virtual machine images. The processing may additionally include determining, for the VM image indicated in the user's request, the usage-type specific VM resource usage profile, and using the determined usage-type specific VM resource usage profile as the VM resource usage profile that is read for executing the analysis of the profiles for determining the resource pool having the least aggregated resource consumption.

Additionally, the resource consumption specified in the VM resource usage profile and/or the user-specific VM resource usage profile may be used to determine if the resources required by the requested virtual machine image instance in one or more future moments of time will be available in at least one resource pool in one or more future moments in time.

In a further aspect, the present subject matter relates to a computer-readable storage medium that includes computer-readable instructions which, when executed by a processor/computer, cause the processor/computer to perform any of the processing described above and below.

A computer system may include a storage device comprising a plurality of VM images, multiple resource pools, each resource pool comprising one or more resources, and an interface adapted for receiving a request of a user for deploying a new instance of one of the VM images, the request being indicative of the VM image to be instantiated. A placement engine may be adapted for reading a VM resource usage profile stored in association with the indicated VM image, the read VM resource usage profile including first resource consumption data, and the first resource consumption data being indicative of a predicted resource consumption of the requested instance of the indicated VM image over a first period of time. The placement engine may further be adapted for reading one resource pool profile for each of the multiple resources pools, each resource pool specific profile including second resource consumption data, the second resource consumption data being indicative of a predicted resource consumption in the resource pool associated with the resource pool profile over a second period of time, and the resource pool profile further including a current resource consumption on the resource pool. The placement engine may further be adapted for analyzing, for each of the resource pool profiles, the read VM resource usage profile and the resource pool profile, the analysis including aligning the read VM resource usage profile and the read resource pool profiles by aligning the second time period of the read resource pool profiles of the resource pool with the first time period of the read VM resource usage profile. The placement engine may further be adapted to calculate, for each of the resource pool profiles, an aggregated resource consumption profile being predictive of a total resource consumption on the resource pool by aggregating the resource consumption of the aligned profiles. Additionally, the placement engine may be adapted to determine, as a result of the analysis of all resource pool profiles, the one of the multiple resource pools having the least aggregated resource usage.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
by a placement engine that instantiates virtual machine (VM) instances:
receiving a request from a user to deploy an instance of a VM image;
reading a VM resource usage profile (RUP) that indicates a predicted resource consumption of the requested instance of the VM image over a first period of time;
retrieving an existing user-specific VM resource usage profile (URUP) for the instance of the VM image requested to be deployed over the first period of time;
determining user-specific patterns based on combined respective data of the RUP and respective data of the URUP;
reading one resource pool profile for each of a plurality of resources pools, where each resource pool profile indicates a predicted resource consumption in the respective resource pool over a second period of time;
for each resource pool:
generating a resulting VM resource usage profile from a selected one of the VM RUP and the URUP;
analyzing the resulting VM resource usage profile and the resource pool profile, the analysis comprising aligning the resulting VM resource usage profile and the respective resource pool profile of the respective resource pool by aligning the second period of time of the respective resource pool profile with the first period of time of the resulting VM resource usage profile; and
calculating, for existing host platforms, an aggregated resource consumption profile that predicts a total resource consumption over time in the resource pool as an aggregation of the predicted resource consumptions of the aligned profiles by comparing the resulting VM resource usage profile with the resource pool profile of the respective resource pool, wherein the resource pool profile of the respective resource pool is obtained as a superposition of an assigned resource usage profile of all instances of all VMs running on the resource pool;
determining, from the aggregated resource consumption profiles, a resource pool of the plurality of resource pools with a least predicted aggregated resource consumption over time;
determining that the resource pool with the least predicted aggregated resource consumption over time has no free resource on the existing host platform to fit the instance of the VM image, based on a current allocation of resources;
calculating a resource shortage for the determined least predicted aggregated resource pool;
based on the calculated resource shortage, performing, by a resource manager, a reallocation of at least one resource, initially allocated to an instantiated VM image instance in the determined least predicted aggregated resource pool, to the requested VM image, wherein the aggregated resource consumption profiles are used as input for determining another instantiated VM image instance to which the at least one resource is to be reallocated; and
subsequent to reallocating the at least one resource, instantiating the VM image on the least predicted resource pool expected to provide the best available fit for the resource requirements of the VM image.

2. The method of claim 1, where:
if a user-specific VM resource usage profile associated with the user is available and further indicates a predicted user-specific resource consumption of the requested instance of the VM image by the user over the first period of time, where the aligning and calculating are performed using the user-specific VM resource usage profile instead of the VM resource usage profile.

3. The method of claim 2, where:
the user-specific VM resource usage profile comprises user-specific conditions on at least one of a number, a type, and an availability of resources for guaranteeing that at least one of the number, the type, and the availability of the resources allocated to the requested instance of the VM image is in accordance with a service level agreement (SLA); and
determining, from the aggregated resource consumption profiles, the resource pool of the plurality of resource pools with the least predicted aggregated resource consumption over time comprises:
  determining, from the aggregated resource consumption profiles, the resource pool of the plurality of resource pools with the least predicted aggregated resource consumption over time that additionally satisfies the user-specific conditions.

4. The method of claim 1, where the resource pool of the plurality of resource pools with the least predicted aggregated resource consumption over time is selected from a group consisting of:
  a resource pool for which a lowest integral resource consumption value of the aggregated resource consumption profile was calculated; and
  a resource pool for which the lowest integral resource consumption value of the aggregated resource consumption profile was calculated and where the aggregated resource consumption profile does not comprise a value exceeding a resource consumption threshold value.

5. The method of claim 1, further comprising:
  evaluating, by a VM usage supervisor module, a current resource consumption of a plurality of instances of the VM image to provide first evaluated data;
  predicting resource consumption of any instance of the VM image over the first period of time by evaluating the first evaluated data; and
  one of generating and updating the VM resource usage profile of the VM image using the predicted resource consumption.

6. The method of claim 1, further comprising:
  monitoring a number and a type of the resources of the resource pool allocated to a plurality of VM image instances running on the resource pool to provide monitoring data, the monitoring data comprising a measured physical assignment of resources to the plurality of VM image instances over the second period of time;
  superposing the monitoring data obtained for the plurality of VM image instances running on the resource pool to generate a superposed resource consumption profile for the resource pool; and
  using the superposed resource consumption profile to one of generate and update the resource pool profile of the resource pool.

7. The method of claim 1, where each VM image instance running on the resource pool has one or more assigned resources of the resource pool, further comprising:
  determining, by a VM usage supervisor, all resources in the resource pool that are unoccupied over the second period of time by subtracting the aggregated resource consumption profile from a known number of all resources of the resource pool;
  determining, for the requested instance of the VM image instantiated on the resource pool, one or more currently required resources by evaluating one of the VM resource usage profile and a user-specific VM resource usage profile of the VM image; and
  triggering, by the placement engine, the instantiation of the requested instance of the VM image on another resource pool, if a number of resources of a first resource type determined to be required by the requested instance of the VM image exceeds the determined number of currently unoccupied resources of the first resource type in the resource pool.

8. The method of claim 1, further comprising performing, by a resource manager, a reallocation of at least one resource initially allocated to the instantiated VM image instance, where the aggregated resource consumption profiles are used as input for determining another instantiated VM image instance to which the at least one resource is to be reallocated.

9. The method of claim 8, further comprising updating at least one resource pool profile of the plurality of resource pools with new resource consumption data resulting from the reallocation of the at least one resource or from a movement of the instantiated VM image instance.

10. The method of claim 1, where one of the predicted resource consumption indicated in the VM resource usage profile and predicted resource usage data specified in a user-specific VM resource usage profile is used to determine if resources required by the requested instance of the VM image in one or more future moments of time will be available in one of the plurality of resource pools in the one or more future moments in time.

11. A system, comprising:
  a storage device comprising a plurality of virtual machine (VM) images;
  a plurality of resource pools, each resource pool comprising one or more resources;
  an interface; and
  a placement engine device programmed to:
    receive, via the interface, a request from a user to deploy an instance of a VM image;
    read, from the storage device, a VM resource usage profile (RUP) that indicates a predicted resource consumption of the requested instance of the VM image over a first period of time;
    retrieve, from the storage device, a user-specific VM resource usage profile (URUP) for the instance of the VM image requested to be deployed over the first period of time;
    determine user-specific patterns based on combined respective data of the RUP and respective data of the URUP;
    read, from the storage device, one resource pool profile for each of the plurality of resources pools, where each resource pool profile indicates a predicted resource consumption in the respective resource pool over a second period of time;
    for each resource pool:
      generate a resulting VM resource usage profile from a selected one of the VM RUP and the URUP;
      analyze the resulting VM resource usage profile and the resource pool profile, the analysis comprising a step to align the resulting VM resource usage profile and the respective resource pool profile of the respective resource pool by aligning the second period of time of the respective resource pool profile with the first period of time of the resulting VM resource usage profile; and
      calculate, for existing host platforms, an aggregated resource consumption profile that predicts a total resource consumption over time in the resource pool as an aggregation of the predicted resource consumptions of the aligned profiles by comparing the resulting VM resource usage profile with the resource pool profile of the respective resource pool, wherein the VM RUP of the respective resource pool is obtained as a superposition of an assigned resource usage profile of all instances of all VMs running on the resource pool;

determine, from the aggregated resource consumption profiles, a resource pool of the plurality of resource pools with a least predicted aggregated resource consumption over time;

determine that the resource pool with the least predicted aggregated resource consumption over time has no free resource on the existing host platforms to fit the instance of the VM image, based on a current allocation of resources;

calculate a resource shortage for the determined least predicted aggregated resource pool;

and based on the calculated resource shortage, perform, by a resource manager, a reallocation of at least one resource, initially allocated to an instantiated VM image instance in the determined least predicted aggregated resource pool, to the requested VM image, wherein the aggregated resource consumption profiles are used as input for determining another instantiated VM image instance to which the at least one resource is to be reallocated; and subsequent to reallocating the at least one resource, instantiate the VM image on the least predicted resource pool expected to provide the best available fit for the resource requirements of the VM image.

12. The system of claim 11, where:
if a user-specific VM resource usage profile associated with the user is available and further indicates a predicted user-specific resource consumption of the requested instance of the VM image by the user over the first period of time, where the aligning and calculating are performed using the user-specific VM resource usage profile instead of the VM resource usage profile.

13. The system of claim 11, where the resource pool of the plurality of resource pools with the least predicted aggregated resource consumption over time is selected from a group consisting of:

a resource pool for which a lowest integral resource consumption value of the aggregated resource consumption profile was calculated; and a resource pool for which the lowest integral resource consumption value of the aggregated resource consumption profile was calculated and where the aggregated resource consumption profile does not comprise a value exceeding a resource consumption threshold value.

14. A computer program product, comprising:
a computer readable storage memory having computer readable program code embodied therewith, where the computer readable program code when executed on a computer causes the computer to:

receive a request from a user to deploy an instance of a virtual machine (VM) image;

read a VM resource usage profile (RUP) that indicates a predicted resource consumption of the requested instance of the VM image over a first period of time;

retrieve a user-specific VM resource usage profile (URUP) for the instance of the VM image requested to be deployed over the first period of time;

determine user-specific patterns based on combined respective data of the RUP and respective data of the URUP;

read one resource pool profile for each of the plurality of resources pools, where each resource pool specific profile indicates a predicted resource consumption in the respective resource pool over a second period of time;

for each resource pool:
generate a resulting VM resource usage profile from a selected one of the VM RUP and the URUP;

analyze the resulting VM resource usage profile and the resource pool profile, the analysis comprising a step to align the resulting VM resource usage profile and the respective resource pool profile of the respective resource pool by aligning the second period of time of the respective resource pool profile with the first period of time of the resulting VM resource usage profile; and calculate, for existing host platform, an aggregated resource consumption profile that predicts a total resource consumption over time in the resource pool as an aggregation of the predicted resource consumptions of the aligned profiles by comparing the resulting VM resource usage profile with the resource pool profile of the respective resource pool, wherein the VM RUP of the respective resource pool is obtained as a superposition of an assigned resource usage profile of all instances of all VMs running on the resource pool;

determine, from the aggregated resource consumption profiles, a resource pool of the plurality of resource pools with a least predicted aggregated resource consumption over time;

determine that the resource pool with the least predicted aggregated resource consumption over time has no free resource on the existing host platforms to fit the instance of the VM image, based on a current allocation of resources;

calculate a resource shortage for the determined least predicted aggregated resource pool;

based on the calculated resource shortage, perform, by a resource manager, a reallocation of at least one resource, initially allocated to an instantiated VM image instance in the determined least predicted aggregated resource pool, to the requested VM image, wherein the aggregated resource consumption profiles are used as input for determining another instantiated VM image instance to which the at least one resource is to be reallocated; and subsequent to reallocating the at least one resource, instantiate the VM image on the last predicted resource pool expected to provide the best available fit for the resource requirements of the VM image.

15. The computer program product of claim 14, where:
if a user-specific VM resource usage profile associated with the user is available and further indicates a predicted user-specific resource consumption of the requested instance of the VM image by the user over the first period of time, where the computer readable program code when executed on the computer further causes the computer to perform the aligning and calculating using the user-specific VM resource usage profile instead of the VM resource usage profile.

16. The computer program product of claim 15, where:
the user-specific VM resource usage profile comprises user-specific conditions on at least one of a number, a type, and an availability of resources for guaranteeing that at least one of the number, the type, and the availability of the resources allocated to the requested instance of the VM image is in accordance with a service level agreement (SLA); and where, in causing the computer to determine, from the aggregated resource consumption profiles, the resource pool of the plurality of resource pools with the least predicted aggregated resource consumption over time, the computer readable program code when executed on the computer causes the computer to:

determine, from the aggregated resource consumption profiles, the resource pool of the plurality of resource pools with the least predicted aggregated resource consumption over time that additionally satisfies the user-specific conditions.

17. The computer program product of claim 14, where the resource pool of the plurality of resource pools with the least predicted aggregated resource consumption over time is selected from a group consisting of:
- a resource pool for which a lowest integral resource consumption value of the aggregated resource consumption profile was calculated; and
- a resource pool for which the lowest integral resource consumption value of the aggregated resource consumption profile was calculated and where the aggregated resource consumption profile does not comprise a value exceeding a resource consumption threshold value.

18. The computer program product of claim 14, where the computer readable program code when executed on the computer further causes the computer to:

monitor a number and a type of the resources of the resource pool allocated to a plurality of VM image instances running on the resource pool to provide monitoring data, the monitoring data comprising a measured physical assignment of resources to the plurality of VM image instances over the second period of time;

superpose the monitoring data obtained for the plurality of VM image instances running on the resource pool to generate a superposed resource consumption profile for the resource pool; and use the superposed resource consumption profile to one of generate and update the resource pool profile of the resource pool.

* * * * *